United States Patent [19]

Mátyasi et al.

[11] Patent Number: 4,477,427
[45] Date of Patent: Oct. 16, 1984

[54] PROCESS FOR THE PREPARATION OF ALKALI-POOR α-ALUMINA FOR CERAMIC PURPOSES

[75] Inventors: József Mátyasi; György Kaptay; László Zsembery, all of Almásfüzito-felso; Béla Kökény, Komárom; József T. Tóth, Almásfüzito-felso; Mária Tóth Née Hömöstrei, Almásfüzito-felso; Imre Pénzes, Almásfüzito-felso, all of Hungary

[73] Assignee: Magyar Aluminiumipari Troeszt, Budapest, Hungary

[21] Appl. No.: 440,260

[22] Filed: Nov. 9, 1982

[30] Foreign Application Priority Data

Nov. 10, 1981 [HU] Hungary .................. 3358/81

[51] Int. Cl.³ .......................... C01F 7/30; C01F 7/02
[52] U.S. Cl. .................................... 423/628; 423/625
[58] Field of Search ............ 423/626, 625, 628, 131, 423/133

[56] References Cited

U.S. PATENT DOCUMENTS

| | | | |
|---|---|---|---|
| 3,092,452 | 6/1963 | Gitzen | 423/626 |
| 3,092,453 | 6/1963 | Gitzen | 423/131 |
| 3,262,754 | 7/1966 | Lindsay et al. | 423/625 |
| 3,384,454 | 5/1968 | Barrington | 423/625 |
| 4,045,234 | 8/1977 | Ring | 106/62 |
| 4,374,119 | 2/1983 | Schepers et al. | 423/625 |

OTHER PUBLICATIONS

Gwyra, B. et al., "The Coarsening of Bayer Alumina Trihydrate by Means of Crystallization Modifiers", Powder Technology, 11 No. 2, (1975), pp. 101–105.

Primary Examiner—John F. Niebling
Assistant Examiner—B J. Boggs, Jr.

[57] ABSTRACT

Process for the preparation of alkali-poor α-alumina for ceramic purposes. Technical grade aluminum hydroxide is activated and calcinated in the presence of a mineralizing mixture comprising halides and boron compounds. The process further comprises activating aluminum hydroxide at a temperature of 500–600 degrees C., washing the activated product with alkali-free water containing calcium ions and having a conductivity not exceeding 70 μS/cm until the alkali content expressed in $Na_2O$ becomes lower than 0.15% by weight, adding 0.4–0.7% by weight of a mineralizing mixture to the washed product, and calcinating the same at a temperature of 1200–1350 degrees C.

6 Claims, 1 Drawing Figure

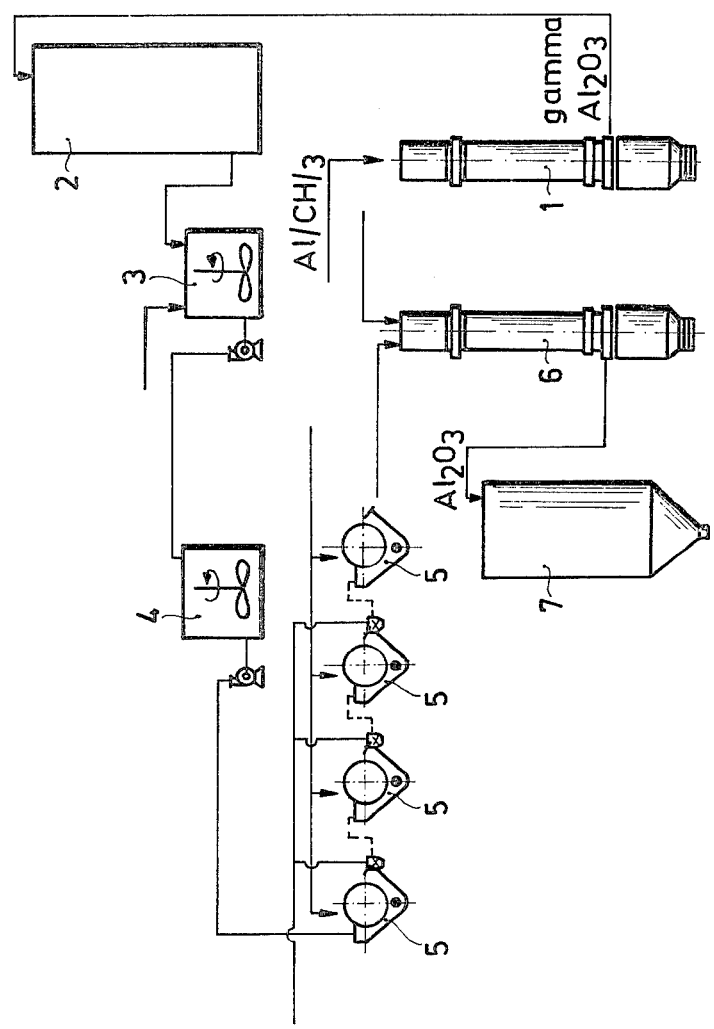

PROCESS FOR THE PREPARATION OF ALKALI-POOR α-ALUMINA FOR CERAMIC PURPOSES

This invention relates to a new process for the preparation of alkali-poor α-alumina (oxide) suitable for ceramic purposes from technical grade aluminum hydroxide. More particularly the present invention is concerned with a process for the preparation of α-alumina suitable for the production of oxide-ceramic products, particularly insulating bodies of spark plugs and electroporcelain wares, such as porcelain insulating bodies, from technical grade aluminum hydroxide obtained by an alkaline process, particularly by the Bayer process or a pyrogenic process.

For the production of the above products the ceramic industry requires alumina which contains at least 98% of the α-modification, which has a relatively uniform particle size, which consists of particles being not larger than 6 μm, and which forms agglomerates easily disaggregating to individual crystals on mold grinding. A further requirement is that the linear shrinking during sintering of the said alumina under the usual conditions of ceramic technology should be unifom and constant; the desired value amounts to about 17–20%. A still further requirement is that the alumina should be very pure, its $Na_2O$ content should not exceed 0.1% by weight, and its $Fe_2O_3$ content should not exceed 0.04% by weight.

Technical grade alumina prepared on industrial scale calcination of technical grade aluminum hydroxide does not generally meet the above requirements, because the sodium oxide content is higher than the above limit and the α-modification content is too low. For this reason α-alumina for ceramic purposes is prepared by other methods. Thus according to Hungarian Pat. No. 158,921 aluminum having a purity of 99.99% is hydrolysed with ammonium hydroxide and the aluminum hydroxide of high purity thus obtained is calcinated at high temperature. According to German Federal Republic Pat. No. 1,467,288 aluminum hydroxide precipitated from the solution of aluminum salts with ammonium hydroxide is subjected to calcination after thorough washing and drying.

The above procedures are both very complicated and expensive and are unsuitable for industrial scale production. Attempts were made to convert technical grade aluminum hydroxide into α-alumina complying with the above requirements. For this purpose simple and inexpensive manufacturing methods suitable for industrial scale production were devised. According to the process described in U.S. Pat. No. 3,092,452 boric acid is added to aluminum hydroxide in an amount of 1–2 moles related to 1 mole of the sodium content expressed in $Na_2O$ and the mixture is heated at 1100–1200 degrees C. and washed. A similar process is disclosed in German Federal Republic Pat. Nos. 809,194 and 1,205,957, wherein 5–7% of diammonium hydrogen phosphate and 5–10% of oxalic acid, respectively are added to the aluminum hydroxide prior to calcination. According to U.S. Pat. No. 3,106,452 aluminum hydroxide is admixed with china and brick scraps and the mixture is calcinated at 1200–1550 degrees C.

It is known that alumina containing more α-modification and less alkali metal contamination can be obtained by adding to aluminum hydroxide prior to calcination halide salts, particularly ammonium chloride, ammonium fluoride or aluminum fluoride (G. N. Gopienko, T. A. Zavarickaja: Cvetnue Metalli 1980, 4, 53–55). Boric acid exhibits a similar effect.

The process disclosed in U.S. Pat. No. 3,092,453 is based on the use of the so-called mineralizing additives. According to the said process to aluminum hydroxide 0.25–2% by weight of aluminum fluoride and 0.1–1 mole of boric acid (related to 1 mole of alkali content expressed in $Na_2O$) are added and the product is calcinated at a temperature of about 900 degrees C. and washed with water. However, the product thus obtained does not always contain a sufficient amount of α-alumina. In order to reach the desired amount of α-modification the product must be again subjected to calcination. As a result of this step, however, an undesired increase of the particle size takes place and the product becomes contaminated.

A similar process is disclosed in German Federal Republic Pat. No. 1,592,105; according to this process aluminum hydroxide is at first heated to 300 degrees C. until its water-content is decreased to 8%, it is then ground, whereupon 2% by weight of boric acid and 0.5% by weight of hydrogen fluoride are added, the product is granulated and the granules are heated in a special shaft furnace at a temperature of 1400 degrees C. for half an hour in a gas current. The said process is accompanied by several drawbacks, namely complicated technology and complicated appartus are required and is unsuitable for industrial scale production.

The object of the present invention is to provide a simple process for the preparation of alkali-poor α-alumina for ceramic purposes which process is suitable for industrial scale production too and yields a product fully complying with all of the above requirements.

It has been found that the above object can be achieved by preparing α-alumina by activating technical grade aluminum hydroxide and calcinating the same in the presence of a mineralizing mixture comprising halides and boron compounds, wherein the improvement resides in activating aluminum hydroxide at a temperature of 500–600 degrees C., washing the activated product with alkali-free water containing calcium ions and having a conductivity not exceeding 70 μS/cm until the alkali content expressed in $Na_2O$ becomes lower than 0.15% by weight, adding 0.4–0.7% by weight of a mineralizing mixture to the washed product and calcinating the same at 1200–1350 degrees C.

It has been found that the quality of the product can be improved by adding a calcium salt to the mineralizing mixture.

It has been found that the above-mentioned favorable effect of the known mineralizing additives, particularly that of boric acid, takes place to a satisfactory extent only if the alkali content of the product to be calcinated is lower than a certain threshold value.

The above threshold value amounts to 0.15% (expressed as $Na_2O$).

The alkali contamination above the said value are removed from the starting material by washing with water prior to the addition of the mineralizing agents. According to a further recognition this operation is only successful if the aluminum hydroxide has been previously activated to a suitable extent. For this reason activation is carried out at 500–600 degrees C.

Accoding to a still further recognition the particle structure of the product is highly favorably effected by the presence of calcium ions. Thus less angular crystals are formed, hence on sintering the ceramic mass formed from this product a uniform shrinking free of deformations takes place. Generally a very small amount of calcium is sufficient, the low calcium content of water used for washing the activated product can achieve a satisfactory result. A larger amount of calcium can be provided, if necessary, by adding a calcium salt, preferably calcium fluroide, to the mineralizing mixture.

In the process of the present invention as starting material the product of any alkaline bauxite processing method can be used without purification. Thus technical grade aluminum hydroxide can be used as starting material. Aluminum hydroxide prepared by the Bayer process is generally used, but aluminum hydroxide prepared by the pyrogenic method can be applied as well. A significant advantage of the process of the present invention resides in the fact that no particular requirements are raised towards the starting material.

The aluminum hydroxide used as starting material is activated at a temperature of 500–600 degrees C. For this purpose any apparatus can be used such as any treatment equipment used in alumina industry (e.g. a rotary tube furnace). It is preferred to carry out the process until the bound water content of the product is decreased to 2–7%. The duration of the thermal treatment is generally 10–30 minutes.

The activated product is washed with alkali-free water. For this purpose water containing calcium ions is used. The upper limit of the calcium ion content is determined by the fact that the conductivity of the water should not exceed 70 $\mu$S/cm. It is preferred to use water containing about 100 mg/l for washing. In order to reduce the alkali contamination to the desired level it is expedient to repeat some times the washing and subsequent filtration steps. The $Na_2O$ content can be decreased below the threshold value of 0.15% by washing the product three or four times. For industrial scale production one may proceed preferably by taking a sample from the solid product after drying the sample and determining the total sodium content thereof by a suitable method, e.g. by flame photometry. If the sodium content is below the said threshold value, no more washing is required. It has been found that the number of washings thus adjusted can remain unchanged for a long period of time.

After washing a mineralizing mixture is added to the aluminum oxide in an amount of 0.4–0.7% related to its total weight. It is preferred to add 0.3–0.45% by weight of boric acid and 0.1–0.15% by weight of aluminum fluoride as halide compound to the product but other boron or halide compounds can be used as well. As already mentioned above the presence of calcium is particularly advantageous. It is highly preferred to add a calcium salt, preferably 0.1–0.15% by weight of calcium fluoride, to the product to be calcinated.

The product admixed with the mineralizing additive is calcinated in a suitable thermal treating apparatus, preferably in a rotary kiln. The time of calcination is generally 20–30 minutes.

The calcinated product is alumina containing 98% or more of the $\alpha$-modification. The size of the individual crystals is 3–6 microns, after thermal treatment carried out at 1600 degrees C. for 2 hours the shrinking amounts to 18–19%, its alkali content expressed in $Na_2O$ is 0.05–0.1%. On the basis of its above properties the product is suitable for the manufacture of oxide ceramic wares and electroporcelains.

The most preferred embodiments of the process of the present invention are shown in the accompanying drawing, wherein:

The operations and steps of the process of the present invention and the equipment used thereto are schematically illustrated in the said FIGURE.

Aluminum hydroxide is introduced into a rotary kiln. Here the starting material is heated with a hot gas stream having a temperature of 500–600 degrees C. The transit velocity (dwelling period) of the starting material is adjusted so that in the rotary kiln the bound water content should decrease to 2–7%. The activated product is led into a storage receiver 2 and herefrom it is added into a slurry recipient 3 by means of an automatic powder feeder. In slurry recipient 3 the product is admixed with alkali-free water containing calcium ions and having a conductivity not exceeding 70 $\mu$S/cm to yield a suspension having a concentration of 500–600 g/l. The suspension is pumped via buffer receiver 4 onto the first, lefthand, filter 5 with the aid of a pump, whereupon it is filtered and flushed on the filter. The product is slurried again, the suspension is pumped onto the second filter where the same steps are carried out as on the first filter. This operation is repeated on the third and fourth filter in an analogous manner. To the product removed from the last filter a 3:1 parts by weight mixture of boric acid and aluminum fluoride is added in an amount of 0.4–0.7% based on the total weight of the product. Thereafter the product is introduced into rotary tube furnace 6 and calcinated at 1200–1350 degrees C. The calcinated product is stored in storage recipient 7 until it is packed or transported to the place of destination.

It can be seen from the aforesaid that the process of the present invention comprises quite simple steps and no specific apparatus is required. It has been found that the equipments generally used in alumina industry are suitable to be applied in the process of the present invention.

Further details of the process of the present invention are to be found in the following Examples without limiting the scope of protection to the said Examples.

EXAMPLE 1

Into a rotary tube furnace (diameter 2 m length 50 m) 3 tons/hour technical grade aluminum hydroxide are introduced. The product is led through the furnace within 25 minutes. Thus activated alumina is obtained with a heating loss of 2%.

The activated alumina thus obtained is admixed with water containing 110 mg/l of calcium ions and having a conductivity of 60 $\mu$S/cm. The suspension having a concentration of 600 g/l thus obtained is filtered and the substance is washed on the filter. The filtration and washing steps are repeated three times. After the last filtration step a product having an alkali content of 0.10% of $Na_2O$ is obtained.

To the washed product 0.3% by weight of boric acid and 0.1% by weight of aluminum fluoride are added (based on the total weight). The product is thoroughly admixed with the said additives and calcinated at 1200 degrees C. for 25 minutes.

EXAMPLE 2

Into the tube furnace according to Example 1 heated to 550 degrees C. 2.5 ton/hour of technical grade aluminum hydroxide are added. The dwelling period of the product in the tube amounts to 20 minutes. Thus activated alumina is obtained with a loss of 5%.

The thus activated alumina is washed as described in Example 1 except that a suspension having a concentration of 500 g/l is prepared. The total $Na_2O$ content of the alumina thus washed amounts to 0.12%.

The washed product is admixed with 0.45% by weight of boric acid, 0.15% by weight of aluminum fluoride and 0.10% by weight of calcium fluoride (based on the total weight). The product is finally calcinated at 1250 degrees C.

In the following Table I some characteristic properties of the product prepared according to Example 1 are compared with those of the product according to U.S. Pat. No. 3,092,453. It is to be noted that the latter product was calcinated at first at 1100–1200 degrees C. for 3 hours in order to provide a completely fair comparison.

TABLE I

| Physical-chemical Characteristics | Product according to Example 1 | Product according to U.S. Pat. No. 3,092,453 |
|---|---|---|
| $Al_2O_3$ content, % | 99.8 | 99.05 |
| Total $Na_2$ content, % | 0.07 | 0.22 |
| Soluble $Na_2O$ content, % | 0.06 | 0.12 |
| $\alpha$-$Al_2O_3$ content, % | 99 | 96 |
| Losses of calcination, % | 0.12 | 0.1 |
| Density, g/cm$^3$ | 3.96 | 3.9 |
| Specific surface, m$^2$/g | 0.8 | 0.8 |
| Apparent compactness, PKL g/cm$^3$ | 1.8 | 1.7 |
| Linear shrinking, % (1600 degrees C., 2 hours) | 19 | 24 |
| D SUB 50 $\mu$m | 3–5 | 6–8 |
| Average agglomerate size, $\mu$m | 25–30 | 35–40 |

Although the invention is illustrated and described with reference to a plurality of embodiments thereof, it is to be expressly understood that it is in no way limited to the disclosure of such preferred embodiments but is capable of numerous modifications within the scope of the appended claims.

We claim:

1. Process for the preparation of alkali-poor $\alpha$-alumina for ceramic purposes, comprising
   (a) activating technical grade aluminum hydroxide by heating it to a temperature of 500°–600° C.,
   (b) washing the activated product with alkali-free water containing calcium ions and having a conductivity not exceeding 70 $\mu$s/cm until the alkali content expressed in $Na_2O$ becomes lower than 0.15% by weight, and
   (c) calcinating the same in the presence of a mineralizing mixture comprising halides and boron compounds.

2. Process according to claim 1, which comprises activating aluminum hydroxide for 10–30 minutes.

3. Process according to claim 1, which comprises adding to the washed product as mineralizing mixture 0.3–0.45% by weight of boric acid and 0.1–0.15% by weight of aluminum fluoride, based on the total weight.

4. Process according to claim 1, which comprises using a mineralizing additive, containing a calcium salt.

5. Process according to claim 4, which comprises adding to the washed product as mineralizing mixture 0.3–0.45% by weight of boric acid, 0.1–0.15% by weight of aluminum fluoride and 0.1–0.15% by weight of calcium fluoride, based on the total weight.

6. Process according to claim 1, which comprises carrying out calcination for 20–30 minutes.

* * * * *